United States Patent [19]

Kidushim

[11] Patent Number: 5,682,811
[45] Date of Patent: Nov. 4, 1997

[54] INDOOR GRILL AND METHOD OF GRILLING FOODS

[76] Inventor: Margaret A. Kidushim, 110 E. Ninth St., No. A767, Los Angeles, Calif. 90079

[21] Appl. No.: 609,373

[22] Filed: Mar. 1, 1996

[51] Int. Cl.6 .................. A47J 37/00; F24B 3/00
[52] U.S. Cl. .................. 99/400; 99/446; 99/450; 126/27
[58] Field of Search .................. 99/400, 425, 422, 99/446, 450; 126/273 R, 275 R, 273.5

[56] References Cited

U.S. PATENT DOCUMENTS 4,508,024  4/1985  Perkins .................. 99/446 X
4,696,816  9/1987  Fabbro .................. 99/446 X
4,976,252  12/1990  Cianciola .................. 99/425 X

*Primary Examiner*—Reginald Alexander
*Attorney, Agent, or Firm*—Merchant, Gould, Smith, Edell, Welter & Schmidt

[57] ABSTRACT

An arrangement for barbecue cooking indoors on an existing gas or electric heating element includes a base, substantially rectangular in plan view, having a water well concavity sized radially and in depth to receive water and a substantial volume of stones of high surface area to volume ratio. A grill element conforming to and seated on the base has apertures communicating with the water well area and the stones, such that drippings from the food fall into the stones while vapors from the heated stones flow back to the items being cooked. A barbecue flavor is imparted to the food while at the same time it is cooked rapidly and efficiently.

6 Claims, 2 Drawing Sheets

FIG. 1
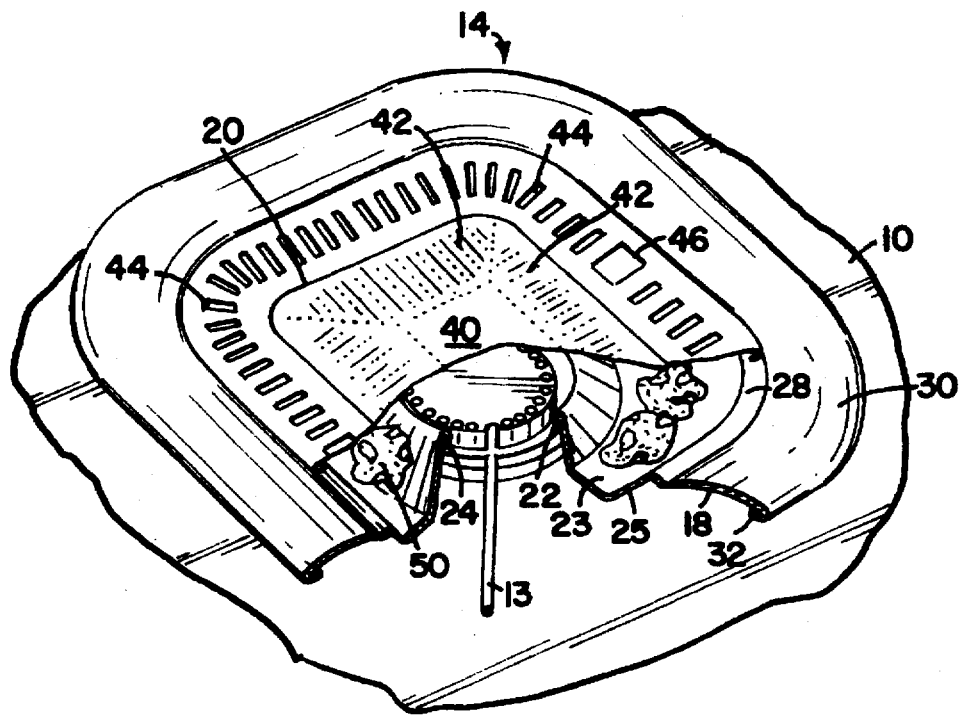
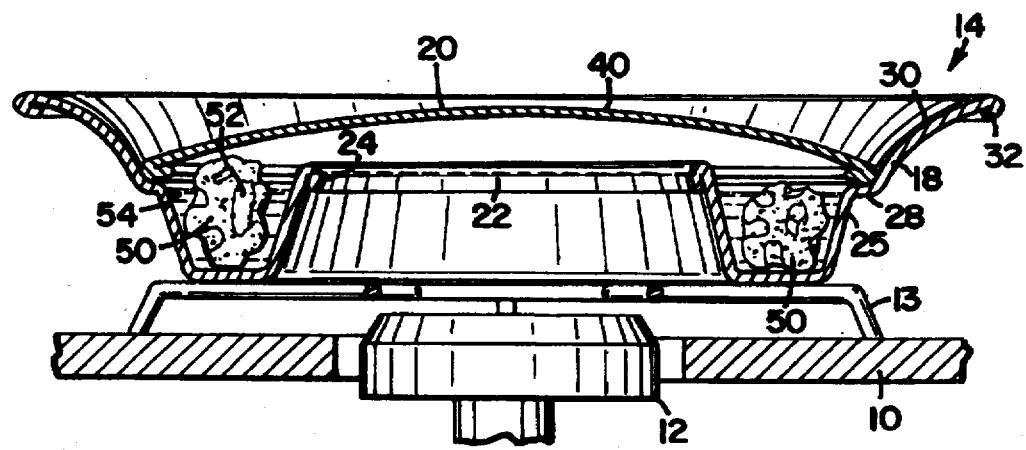
FIG. 2

INDOOR GRILL AND METHOD OF GRILLING FOODS

This invention relates to devices and methods for preparing foods by grilling, and more particularly, to devices and methods for cooking and flavoring foods on an indoor heating element so as to provide efficient cooking and impart a desirable flavor as well.

BACKGROUND OF THE INVENTION

A number of devices are currently known and in use for grilling foods on electrical or gas heating elements of a range or stovetop. Other devices are known which incorporate their own heating element in conjunction with a grill, and those also seek to provide a like result with indoor cooking. These devices can include special arrangements for minimizing smoke and reducing the danger of substantial flaming from meat juices.

Although the present invention may be employed with separate heating elements, the just-mentioned category of indoor grills is not truly relevant to the approach taken herein. The present approach is more related to a class devices which have been in use for sometime that employ a water well about the heating element. In these prior art units, a base of circular outline includes a half-ring concavity or water well about the heating element, the base being surmounted by a substantially horizontal grill that is heated through the center of the base. The water absorbs some of the heat energy used, but also provides a receiver for juices flowing out of the food, to minimize any possibility of flaming, and at the same time, reduce problems with cleaning the device after use.

A major disadvantage of these prior art systems is that they cannot impart the barbecue flavor that is widely preferred. Another is that some of these grilling techniques expose the food to excessive heat and smoke, which can result in carbonized tars and the consequent unhealthful effects of sometimes carcinogenic materials. It is therefore an objective of the present invention to provide an improved device and method, in which cooking efficiency is retained and even augmented, but in which the flavor of the cooked product is more.

SUMMARY OF THE INVENTION

In accordance with the invention, a device and cooking method are provided in which direct convection and conduction of heat to the underside of a grill surface is aided and augmented by lateral transfer of heat outwardly from a heating element. The surrounding volume contains solid pieces having high surface area to volume ratio and substantial thermal capacity. The solid objects, preferably irregularly shaped impermeable stones with many concavities, are disposed within a water well having a substantial radial span and depth, to receive both the stones and the water bath. The grill surface includes apertures coextensive with the water well, for transfer of food drippings downwardly onto the stones and water, and communication of heated vapors from the stones back to the food. This dual flow provides a dual interchange, with the food being cooked so as to enhance the grilling, provide the desired barbecue taste, maintain control of the heating, and eliminate flaming.

In a more specific example in accordance with the invention, a base containing a water well defines a central aperture for placement about an existing stove top heating element, electrical or gas. The water well has radial dimensions and a depth that are substantially equal to each other and also approximately equal to or only slightly smaller than the radius of the central aperture. The outer periphery of the water well is defined by a seating shoulder for receiving the top or surface grill. By using a substantially rectangular configuration about the central aperture, the water well volume is increased, but rounded corners impact a pleasing aesthetic effect without substantial loss of volume. The base is an integral unit having a peripheral rim curved upwardly and outwardly from the seating shoulder to the outer edge, to provide a convenient means for manual handling of the entire unit. The surface grill comprises a generally planar integral element with a flat central area at its crest, and gently sloping sides leading down to the outer edge. Radial apertures spaced in the region immediately above the water well, when the grill is in position, are disposed about and adjacent the periphery of the top or surface grill. The sloping surface therefore guides juices down along low profile ridges from the food being cooked to these apertures and onto the impermeable stones and into the water well. Also, the apertures allow vapors emanating from the heated stones to flow upwardly to the food being cooked.

In accordance with other aspects of the invention, the water volume, including that displaced by the high surface area rocks in the water well, is sufficient to permit cooking, by grilling or roasting, for a substantial period of time without diminution of the water level by evaporation. However, if there is water evaporation, the surface grill also includes an aperture for adding water into the water well prior to cooking or whenever needed thereafter. The surface grill also includes a high-temperature resistant, low friction coefficient, surface coating that limits adherence of the cooked food to the surface grill.

BRIEF DESCRIPTION OF THE DRAWINGS

A better understanding of the invention, as well as the invention itself, may be had by reference to the following description, taken in conjunction with the accompanying drawings, in which:

FIG. 1 is a perspective view, partially broken away, of a device in accordance with the invention as mounted on a conventional stove top;

FIG. 2 is a side-sectional view of the device of FIG. 1;

DETAILED DESCRIPTION OF THE INVENTION

Figure 3:
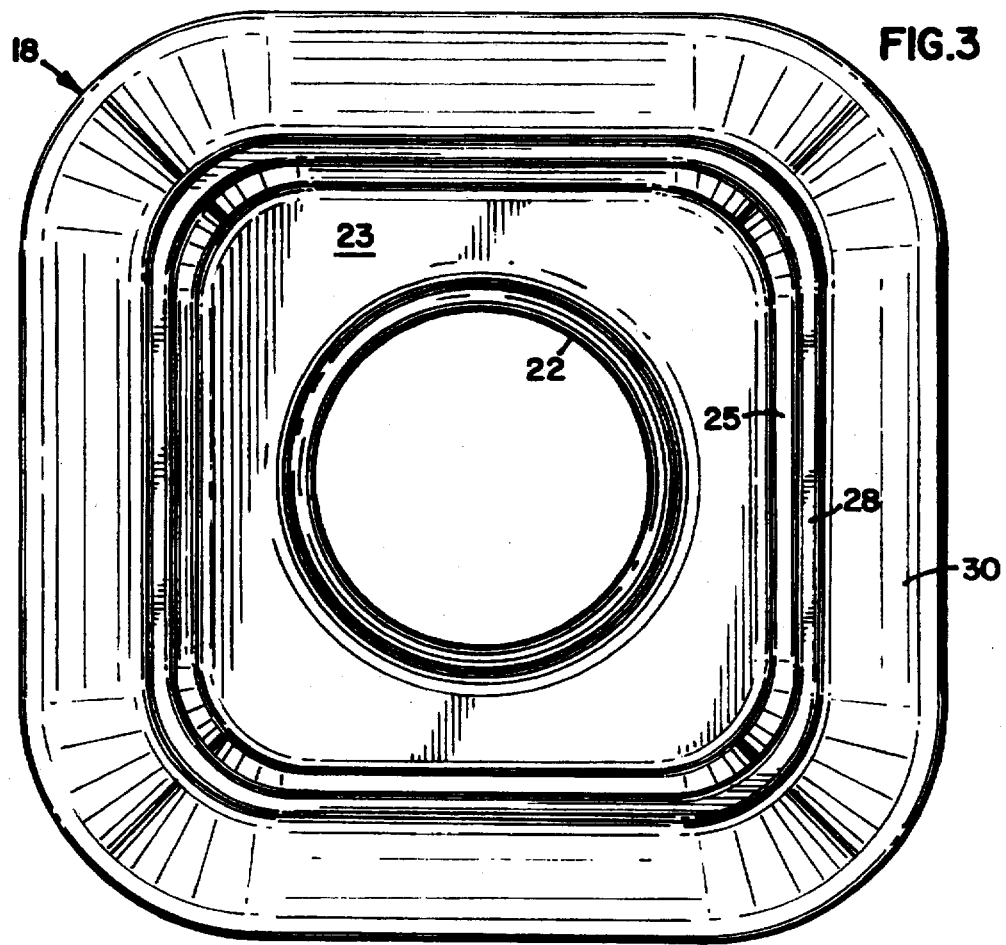
FIG. 3 is a plan view of the base of the device of FIGS. 1 and 2.

A device in accordance with the invention, referring now to FIGS. 1–4, is shown as employed in conjunction with a range top 10 have a gas burner 12. In this example, a trivet 13 on the range top 10 which spans the burner 12 is shown for supporting an indoor grill device 14. With an electric heating element, the device 14 would simply be placed on or about the element itself. The indoor grill device 14 comprises only two parts, a base 18 for seating on the trivet 13 and a top or surface grill panel 20 that is seated on top of the base 18 and covers its interior region. The base, as seen in FIGS. 1–3 particularly, has an innermost ring or circular rim 22, forming the inner side of a water well concavity 23, and a central folded over edge 24 which defines a central aperture large enough so that a gas or electric burner can be encompassed within it.

The base also includes an outer slanted wall 25, such that the outer perimeter of the water well concavity 23 is defined by generally converging sides, with the bottom of the base 18 being a generally flat surface at the bottom of the water well 23. As seen in FIG. 3, the outer slanted wall 25 of the water well 23 has a periphery that is not circular but is generally rectangular with rounded corners, thus increasing the volume available for water and providing a pleasing aesthetic effect. The periphery of the water well 23 is defined by a relatively narrow seating shoulder 28, which merges into an outer rim 30 whose periphery has the generalized square shape with rounded corners of the water well. In cross-section, as seen in FIG. 2, the rim 30 curves upwardly and outwardly to an outer edge, which is formed by a re-entrant lip 32. The rim 30 and lip 32 enable the user to lift the entire device 14 as a unit conveniently by gripping the edges.

The grill panel 20, best seen in FIGS. 1 and 2, has an outer periphery co-extensive with the seating shoulder 28 on the base 18, and comprises an integral planar surface having a relatively small, flat central crest 40 of rectangular form, with four gently sloping sides in the central region, each including parallel low profile ridges 42 leading outwardly from the crest 40. In the near-perimeter area leading to the peripheral edge, the grill panel 20 includes a number of elongated apertures 44 which lie above the water well 23 when the panel 20 is in place. The apertures 44 allow flow of juices from cooked foods down into the water well below and onto rocks in the water well, as described below. A single rectangular aperture 46 (FIG. 1 only) is also provided in this region, and is of sufficient area to allow pouring water easily into the water well during initial filling or during cooking. The panel in this example is of 0.6 mm thickness, the base being of 0.8 mm thickness.

As seen particularly in FIGS. 1 and 2, the water well 23 also receives a number of stones 50 which are of solid impermeable material but with an irregular outer shape and substantial surface concavities 52. Such rocks 52 are preferably of volcanic origin, and while not of the porous type, they have a high surface area to volume ratio because of the concavities 52. These stones 50 are of lateral dimension selected such that they generally partially protrude above the water 54 in the water well 23. This not only decreases the amount of water actually needed to fill the water well 23 volume, but enables surface heating and an interaction with food juices. The water well 23 in this example has a radial dimension which, on average, is approximately the same as the radial dimension from the center of the unit to the nearest central aperture edge, and a depth which has approximately a like dimension. Consequently, there is a substantial volume available for receiving the impermeable stones 50 and the water 54.

Figure 4:
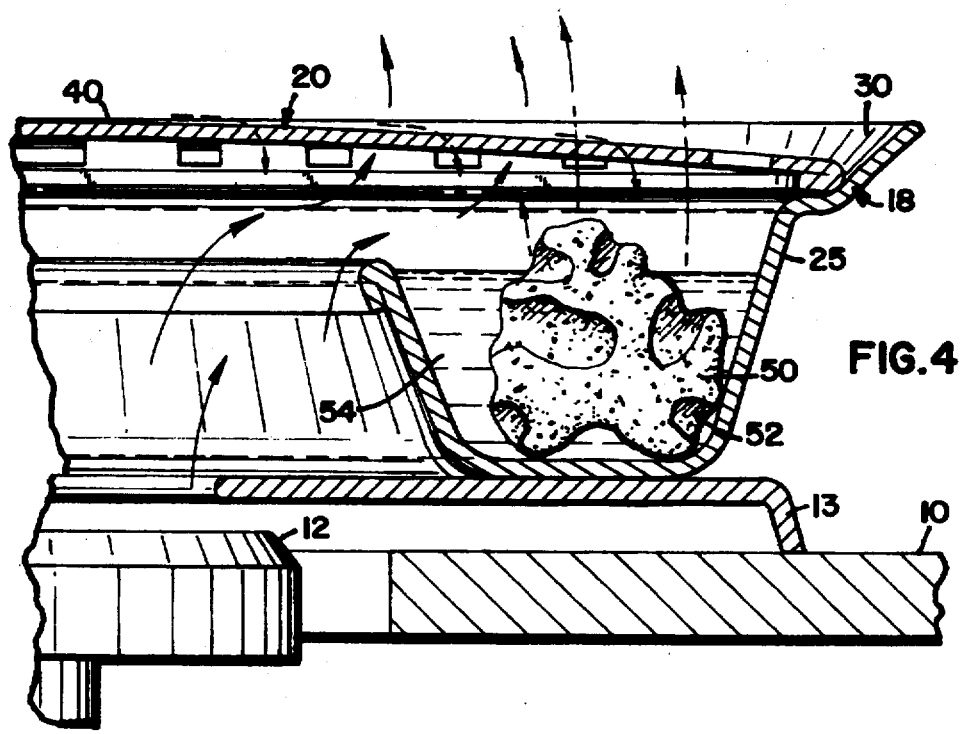
FIG. 4 is a partial sectional view of the arrangement of FIGS. 1–3, useful in explaining the cooking method in accordance with the invention.

In using a device and operating a method in accordance with the invention, referring now particularly to FIGS. 2 and 4 as well as FIGS. 1 and 3, food to be grilled or roasted, such as filets, breasts, chops or steaks, are placed on the uppermost portion of the grill panel 20 after initial preheating. The panel 20 preferably has a high temperature resistant, low friction coating such as "Teflon"™ or another material. Before placing the food in position, the gas burner 12 or other heating element is preferably turned on full for a time, so as to heat the grill panel 20 quickly, searing the meat first on one side and then on the other and thereafter leaving it in position for cooking, at which point the heat from the burner 12 can be stabilized at some lower level.

As cooking continues, heat from the burner 12 maintains the central region temperature of the grill panel 20, and the heat is conducted radially outwardly toward the outer periphery, substantially equalizing the panel 20 temperature throughout. At the same time, heated air from at and above the burner 12 moves radially outwardly toward the water well 23 and the stones 50. As seen in FIG. 4, these heated convective currents are confined under the grill panel 20 until they reach the water 54 and the stones 50, heating protruding parts of the stones particularly. The hot gases then pass upwardly through the elongated apertures 44 in the grill panel 20 and heat the volume including the food on the top panel 22 before rising away.

The high thermal capacity stones 50 of high surface area included in the water well 23 enable substantial heat retention in this region, but at temperatures limited by the adjacent water 54. As food juices drip down onto the stones 50, aromatic vapors are generated that impart the barbecue flavor. Concurrently, some juices fall through the elongated apertures 42 to drop into the water well 23, eliminating any danger of flaming.

This arrangement, by temperature control and geometry, thus promotes the generation of a much higher percentage of aromatic vapors than carbonized tars. With prior art open flame or directly heated briquettes, food juices and fats dripping on to very hot surfaces become superheated and converted to higher molecular weight tars and oils which are stronger and harder components of taste. Additionally, they add the risk of introducing carcinogenic material in the food, as has been widely discussed. In accordance with the present invention, a greater abundance of aromatic vapors arises from the indirect heating of the stones, limited in temperature by the water bath. When these vapors flow up and onto the food being cooked, the result is the desired smoky or barbecue flavor.

While various forms and modifications in accordance with the invention have been described, the invention is not to be regarded as limited thereto, but encompasses all alternatives and variations within the scope of the appended claims.

I claim:

1. An indoor grill for using an existing heating element, electric or gas, to provide a grilled food with a flavor characteristic of an outdoor barbecue, comprising the combination of:

base means defining a central aperture and a water reservoir about the central aperture, the water reservoir having a concave shape, the bottom of which is to rest on a surface (above) about the heating element, and an interior water containing volume sufficient to permit usage during a normal cooking operation without significant evaporation;

a plurality of high surface area stones of transverse dimension sufficient to substantially encompass the depth of the water reservoir, distributed through the water reservoir about the heating element; and a grill panel seated on the base and spanning the water reservoir, the grill panel including a central surface area for the food being grilled above the heating element and a peripheral area including means defining apertures about the central surface area and coextensive with the area including the stones in the water reservoir.

2. A grill as set forth in claim 1 above, wherein the central surface area of the grill panel is higher than the peripheral area and the panel slants downwardly in different directions from the central surface area to the different parts of the peripheral area, and wherein the apertures are sized and configured to direct cooking juices and drippings to fall through the apertures on the stones and water; and to allow steam and aromatic vapors to pass upwardly through the apertures toward the food being grilled at temperatures limited by the water temperature.

3. A grill as set forth in claim 2 above, wherein the stones are of water impermeable character and have extensive surface concavities and wherein the grill panel is of a shape that is approximately rectangular with rounded corners and the grill panel slants down from the central surface area to the peripheral area along each side of the approximate rectangle.

4. A device for indoor preparation of grilled foods on a stovetop heating element, comprising the combination of:

- a base having a generally rectangular periphery with rounded corners and including a peripheral rim and a seating shoulder within the peripheral rim, and an upstanding central rim defining a central aperture of a size to accommodate a stovetop heating element therewithin, the space within the seating shoulder being formed as a concavity about the central ring that defines a water well having a radial span approximately equal to the radius of the central opening, and a depth substantially equal to its radial span, for containment of a substantial amount of water in the water well;
- a plurality of irregular shaped impermeable stones each having a high surface area to total volume ratio, disposed throughout the water well; and
- a surface panel having a periphery disposed within and mating with the seating shoulder of the base, the surface panel being an integral generally planar member having an uppermost central area with sides slanted at a low angle to the outer periphery, and including a plurality of apertures therethrough in the region coextensive with the water well of the base, such that the base, when positioned with the central aperture about a heating element of the stovetop, is open to permit direct heating of the surface panel, with heat being transmitted radially to the stones and the water in the water well and with the juices from food being cooked descending outwardly to the apertures to fall on the stones and the water.

5. A device as set forth in claim 4, wherein the surface panel has a low coefficient of friction coating on its uppermost side, wherein each of the surface panel and the base are integral units, and wherein the peripheral rim of the base extends outwardly and upwardly from the seating shoulder to provide extensions for manually moving the entire unit.

6. A device for indoor preparation of grilled foods on a stove top panel including a heating element, comprising the combination of:

- a base panel including a concave, open topped ring, the base of which seats on a stove top panel about a heating element, the open topped ring defining a central aperture large enough to encompass the heating element, the base panel including an upwardly curved central wall defining the central aperture and an upwardly curved outer wall terminating in an uppermost peripheral lip, the concave ring of the base panel defining an interior water containing well for confining a predetermined height of water within the well;
- a plurality of high surface area stones having complex configurations including surface concavities, the stones having transverse dimensions greater than the predetermined height of the water, and disposed in the well about the central aperture; and
- a grill panel having an outer periphery shaped to seat on the peripheral lip of the base panel, the grill panel having a central upper surface area slanting downwardly on all sides to the grill panel periphery, and including outer apertures disposed within the outer periphery of the grill panel and substantially laterally coextensive with stones in the water well of the base panel, such that a food disposed on the central surface area of the grill panel is grilled by the stove top heating element and drippings drain outwardly and downwardly to the peripheral apertures, and drop onto the stones and into the water, with the temperature of the stones being limited by the water, such that aromatic vapors from the stones are returned via the apertures into the vicinity of the food being grilled.

* * * * *